Oct. 16, 1923.
J. A. INGRAM
1,470,743
MACHINE FOR ROLLING PISTON RINGS
Original Filed Nov. 17, 1919
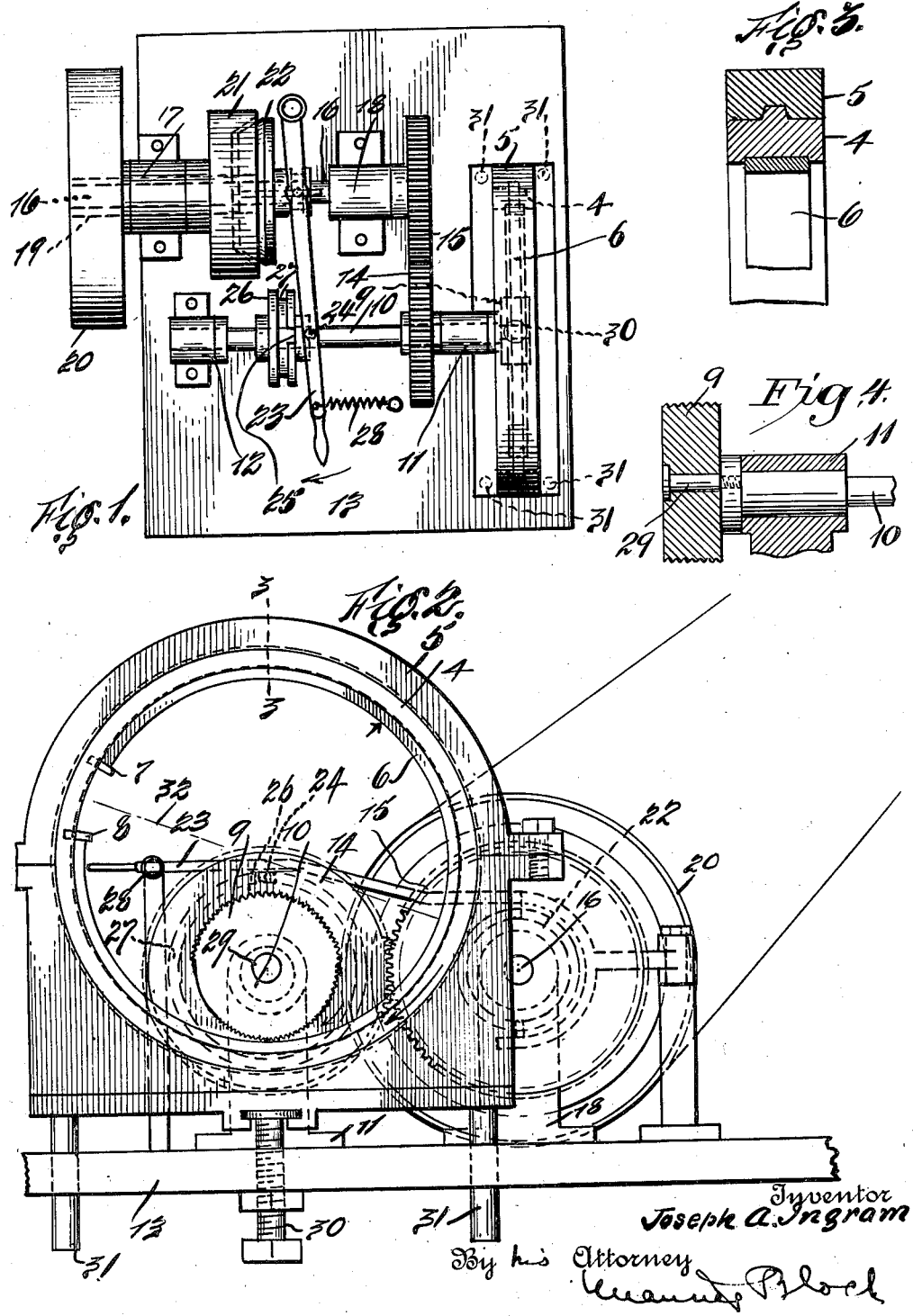

Patented Oct. 16, 1923.

1,470,743

UNITED STATES PATENT OFFICE.

JOSEPH A. INGRAM, OF ATLANTIC CITY, NEW JERSEY.

MACHINE FOR ROLLING PISTON RINGS.

Application filed November 17, 1919, Serial No. 338,520. Renewed January 2, 1923.

*To all whom it may concern:*

Be it known that I, JOSEPH A. INGRAM, a citizen of the United States of America, residing at Atlantic City, Atlantic County, State of New Jersey, have invented certain new and useful Improvements in Machines for Rolling Piston Rings, of which the following is a full, clear, and exact description.

This invention relates to improvements in devices for rolling piston rings for the purpose of imparting to the rings increased resiliency in order that they will tightly fit a cylinder. To carry my improvement into practice, I prefer to roll the rings while they are slightly parted. In other words, I roll a split ring while parted instead of rolling a solid ring and parting same after having been rolled. By rolling the ring, while it is parted, beyond its normal working condition, I am able to produce a ring having greater resiliency after it is placed in a piston than a ring that is parted after it has been rolled, because when the ring is parted and placed in the carrier, it is put under tension which is rendered permanent by the rolling thereof.

I will now describe my invention in detail, the novel features thereof being pointed out in the appended claims, reference being had to the accompanying drawing, wherein:—

Fig. 1 is a plan view of my invention;

Fig. 2 is an enlarged end view looking from the right in Fig. 1;

Fig. 3 is an enlarged fragmentary sectional view, the section being taken on a line 3—3 in Fig. 2, and Fig. 4 is a fragmentary sectional detail view, the section being taken on line 4—4 in Fig. 2.

To carry out my invention, I provide a carrier 4 rotatably supported by a suitable frame 5. During the action of rolling a piston ring, the carrier 4 will be rotated or turned in its frame 5. The piston ring, indicated by 6, is held by the carrier 4 in spread condition or parted at its split portion somewhat more than said ring will be parted while in use. To maintain the ring spread or parted at its split portion, I provide pins 7 and 8, which are carried by the carrier 4. A piston ring to be rolled will be spread apart at its split portion and placed in the carrier and maintained in spread condition by the pins 7 and 8, as shown in Fig. 2. To roll the ring, or impart increased resiliency thereto, I provide a knurled disk 9 eccentrically mounted upon a driven shaft 10 (see Fig. 4) mounted in bearings 11 and 12 which in turn are carried by a bed plate 13. The shaft 10 carries a gear 14 meshing with another gear 15 mounted on a driving shaft 16, which in turn is carried by bearings 17 and 18 on the bed plate 13. The shaft 16 has applied thereto a loose sleeve 19 carrying a belt pulley 20 and a clutch drum or cup member 21. The pulley 20, sleeve 19 and clutch cup 21 will be constantly rotated, and said shaft 16 will be connected for rotation by means of a clutch cone 22 slidably mounted on shaft 16 and operable by means of a lever 23. When lever 23 is moved toward the left in Fig. 1, the cone 22 will be forced into the cup 21 and shafts 10 and 16 will operate, thereby rotating the knurling disk. When the lever 23 is moved toward the left a pin 24 on said lever will pass through the slot 25, on a throw-out disk 26 into an annular channel 27 in said disk. At about the time that pin 24 enters the channel, the disk 22 will engage the clutch cup 21, thereby causing the shafts to rotate. As pin 24 will be located in the channel 22, said clutch will be held in until the opening 25 alines with said pin, at which time the lever will be pulled toward the right, in Fig. 1, by a spring 28. By means of this arrangement, I am enabled to automatically cause the knurling tool to cease its operation after it has made a complete revolution. As the knurling disk will be eccentrically mounted and in contact with the inner periphery of the ring, the said ring will be placed under a varying pressure, during the rotation of the disk, in accordance with a well known mechanical law.

To increase or decrease the pressure exerted upon the ring, I prefer to adjustably mount the frame 5 in order that it can be moved toward or away from the center of the shaft 10. Fig. 2 illustrates the spindle 29 for the disk 9 as mounted eccentric to the center of shaft 10. To adjust the frame 5 toward or away from the center of shaft 10, I provide an adjusting screw 30. As herein illustrated the frame 5 is provided with steady pins 31 which slidably engage the bed plate 13. During the rotation of disk 9 the carrier 4 and ring held thereby will be moved in a circular path in the direction of rotation of the knurling disk 9. The rings will be rolled to the extent of the circumference of the disk 9, and as I prefer to roll the rings throughout a portion thereof only, I employ a disk, the diameter of which, proportionate to the diameter of the ring, is such as to exert pressure upon said portion of the ring during one complete revolution of the knurling disk. In other words, the extent of action upon the ring will be approximately equal to the circumference of the knurling tool. That portion of the ring acted upon will be preferably opposite the split portion of the ring. When the ring is placed in the carrier, said carrier will be turned to cause the spread portion of the ring to be positioned, relative to the point of contact of said ring and said knurling tool or disk so as to roll the ring equally each side of an imaginary line drawn from a central point, between the spread apart ends of the ring, through the center of the ring, such a line being indicated by 32 in Fig. 2. A further object in making the frame 5 adjustable is to enable me to employ disks 9 of different sizes to roll or tension the rings to a greater or less extent.

The disk 26 will be positioned relative to the knurling disk 9 so as to cause the opening 25 to be positioned in vertical alinement with shaft 10 when pin 29 is on its upper center, as indicated in Fig. 2. In other words, this will be the starting position of the disk 9, and when disk 26 is positioned as described, pin 24 on lever 23 will slip through opening 25 to aline with the annular groove 27, at which time clutch 22 will be thrown in. After a complete revolution opening 25 will again assume the position above mentioned and lever 23 will be pulled out by the spring 28. It will therefore be seen that the disk 9 will act with a gradually increasing pressure during one half of a revolution and a gradually decreasing pressure throughout the remaining half. The rotatory action of the disk 9 will impart a rotary motion to the ring and carrier 4.

Having described my invention what I claim is:—

1. In a device to increase the resiliency of piston rings, means to retain a split ring parted, beyond a normal state, at the split portion thereof, and means to expand the inner surface of the ring throughout only that portion of the inner surface of the ring which is opposite the parted split portion.

2. In a device to increase the tension of split piston rings, a rotatable carrier to retain a ring, means to maintain the ring parted at the split portion beyond a normal state, while in said carrier, and a rotary device arranged to exert pressure upon the inner surface of the ring, and impart motion to the carrier.

3. In a device to increase the tension of split piston rings, a rotatable carrier to retain a ring, means to maintain the ring parted at the split portion beyond a normal state, while in said carrier, a rotary device arranged to exert pressure upon the inner surface of the ring, and means to automatically control the extent of operation of said pressure exerting device.

4. In a piston ring tensioning device a rotatable carrier to retain a ring, means to maintain a split ring parted beyond a normal state at the split portion thereof while in said carrier to place said ring under tension, and means to still further increase the tension, consisting of a pressure exerting device acting upon a predetermined portion of the inner surface of the ring.

5. In a piston ring tensioning device, a driven shaft, a driving shaft connected to the driven shaft, means to operate the driving shaft, a clutch mechanism connecting the driving shaft and operating means therefor, a rotary pressure exerting device operated by the driven shaft, means to maintain a piston ring in contact with the pressure exerting device, and means carried by the driven shaft to operate the clutch mechanism to disconnect the driven shaft from its operating means after said pressure exerting medium has completed one revolution.

6. In a piston-ring rolling device, a rotatable carrier to retain a ring to be rolled, and a rotary pressure exerting device to bear against the ring at a selected portion thereof, said pressure exerting device acting in a fixed plane, said carrier and the ring retained thereby having imparted thereto a rotatory motion during a rolling operation by the rotation of the pressure exerting device which bears against the ring.

7. In a piston ring tensioning device, a carrier having a cylindrical seat for a ring to be tensioned, the diameter of said seat exceeding the diameter of the ring to be tensioned to an extent to compel a ring to be expanded considerably beyond a normal state to fit said seat, means carried by the carrier to engage a ring at the parted ends thereof to maintain the ring expanded while in the carrier, and means to exert pressure upon the ring in the carrier through only that portion of the inner surface of the ring which is opposite the parted split portion.

8. In a ring tensioning device, means to retain a split ring parted beyond its normal state to place said ring under tension, and pressure exerting means arranged to act upon said ring to still further increase the tension caused by the parting thereof at the split portion.

Signed at New York city, N. Y., this 15 day of November, 1919.

JOSEPH A. INGRAM

Witnesses:
EDWARD A. JARVIS,
ALBERT RUZIZKA.